United States Patent [19]

Shotwell

[11] Patent Number: 4,470,745
[45] Date of Patent: Sep. 11, 1984

[54] BOAT LOADER AND UNLOADER

[76] Inventor: Allen M. Shotwell, 207 Simpson-Howell Rd., Elizabeth, Allegheny County, Pa. 15037

[21] Appl. No.: 415,487

[22] Filed: Sep. 7, 1982

Related U.S. Application Data

[63] Continuation-in-part of Ser. No. 206,294, Nov. 12, 1980, abandoned.

[51] Int. Cl.$^3$ ............................................. B60P 3/10
[52] U.S. Cl. ................................. 414/462; 188/82.34; 188/82.84; 254/378; 254/380; 403/154; 403/328
[58] Field of Search ............ 414/462, 723; 188/77 R, 188/82.3, 82.34, 82.84, 166; 254/378, 379, 380; 403/150, 152, 154, 328

[56] References Cited

U.S. PATENT DOCUMENTS

| | | | | |
|---|---|---|---|---|
| 1,228,673 | 6/1917 | Hribar | | 188/82.84 |
| 1,645,554 | 10/1927 | Taylor | | 188/82.84 |
| 1,756,459 | 4/1930 | Gormley | | 188/166 X |
| 2,233,798 | 3/1941 | Robins | | 188/166 X |
| 3,436,994 | 4/1969 | Diener et al. | | 188/82.84 |
| 3,488,064 | 1/1970 | Moe | | 188/77 R |
| 3,542,160 | 11/1970 | Sacchini | | 188/82.84 |
| 4,085,856 | 4/1978 | Westendorf | | 414/723 |
| 4,113,126 | 9/1978 | Shotwell | | 414/462 |

FOREIGN PATENT DOCUMENTS 540134  4/1957  Canada ............................. 188/77 R Primary Examiner—Leslie J. Paperner
Attorney, Agent, or Firm—Frease & Bishop

[57] ABSTRACT

A boat loader and unloader has a vertical post which is mounted on the rear of a vehicle. A carriage is slidably and pivotally mounted on the top of the post by rollers. A reel assembly having a crank-operated, cable take-up tube is removably mounted transversely across the midportion of a boat. A cable is attached to and extends between the reel tube and carriage which is clamped to the boat transom. Acutation of the crank-operated reel tube winds the cable about the tube raising the boat from the ground to a position where the boat and carriage then can be pushed forwardly on the rollers to move the boat and carriage to a forward storage position on top of the vehicle. A reverse operation enables an individual to manually unload the boat from on top of the vehicle. An improved conrol mechanism is mounted on the reel and includes a plurality of spring-biased camming rollers which are engaged between ramp surfaces formed on a band brake and a stub shaft attached to the take-up reel. The camming rollers permit free rotation of the stub shaft and cable take-up tube when manually rotating the tube in one direction to load the boat on the vehicle. The rollers function as a brake and prevent rotation of the reel tube in the opposite direction until a pair of straight legs on the band brake are spread further apart by an intervening, manually actuated control lever, permitting the weight of the boat to unwind the cable take-up tube, lowering the boat from its raised position on the vehicle to the ground. In an alternate arrangement actuation of the control lever in a second direction moves the band brake legs closer together to prevent any possible brake slippage during loding and unloading of the boat.

4 Claims, 18 Drawing Figures

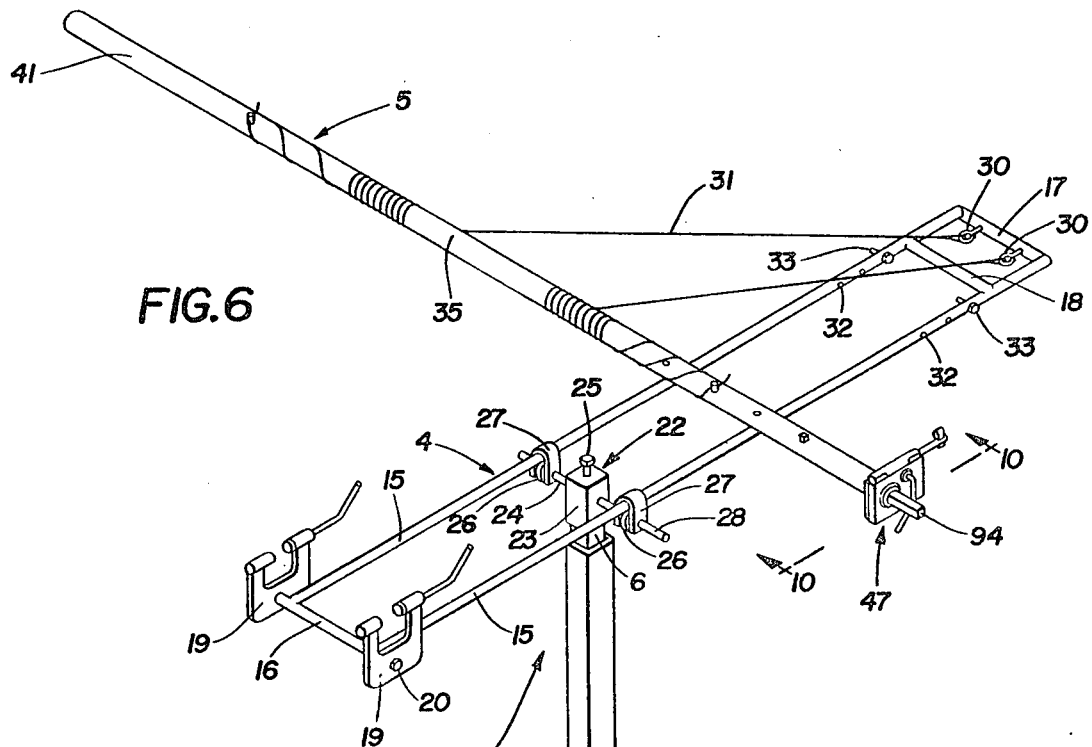
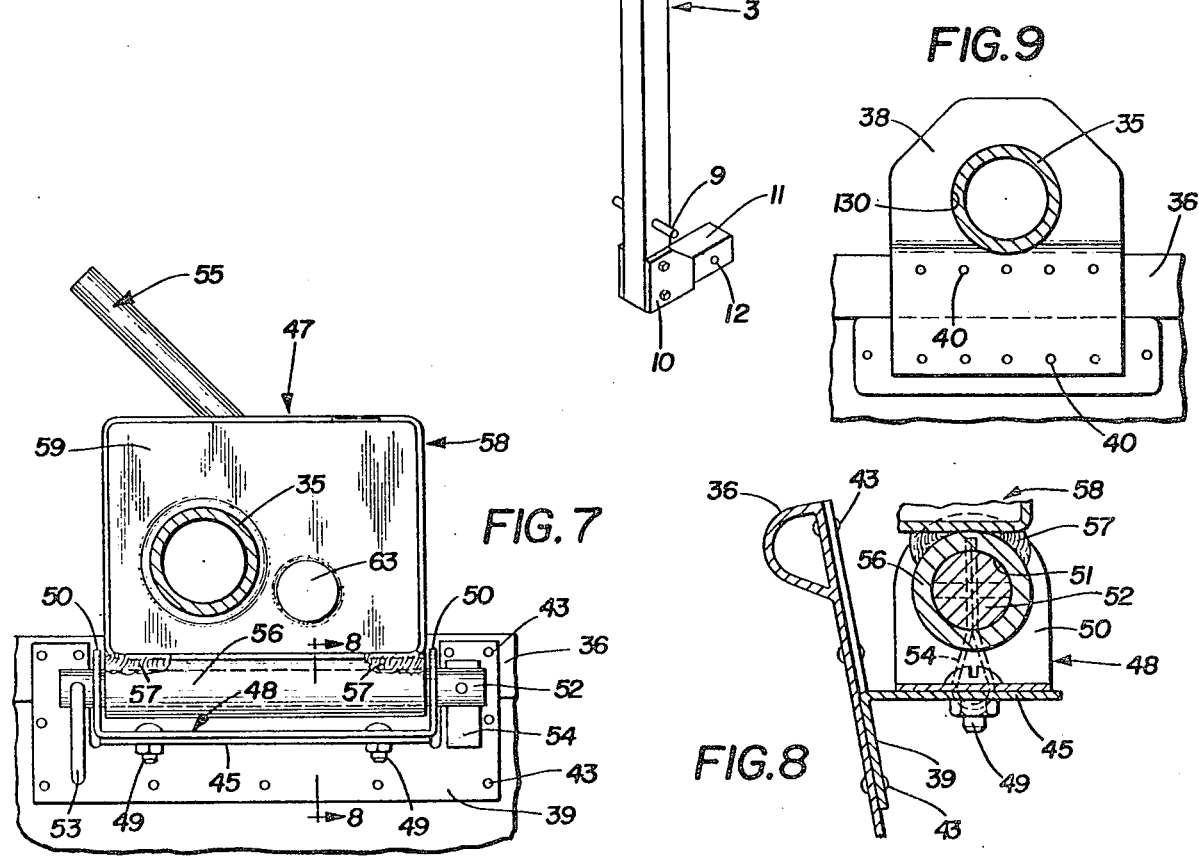

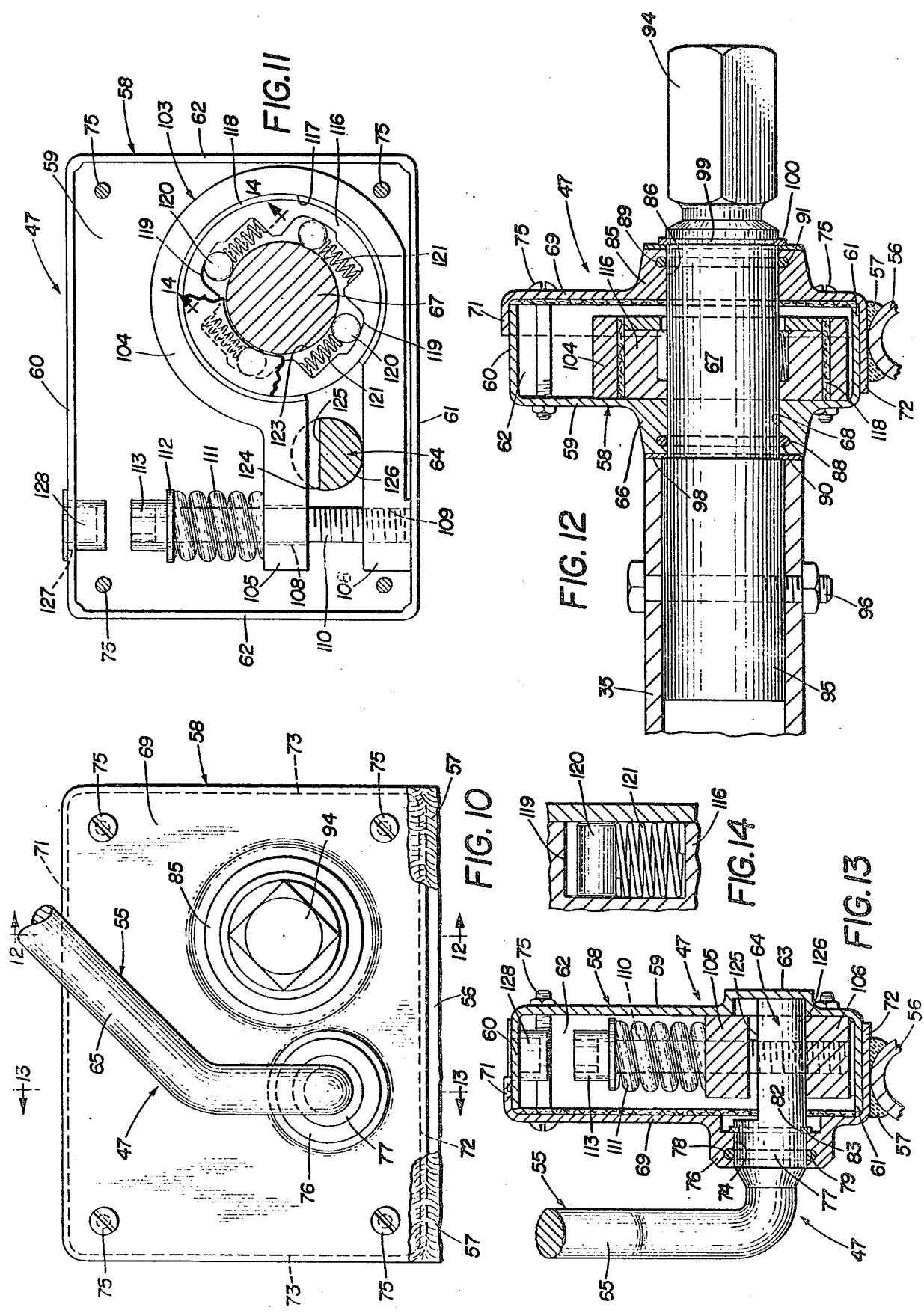

BOAT LOADER AND UNLOADER

CROSS-REFERENCE TO RELATED APPLICATION

This application is a continuation-in-part of my co-pending application, Ser. No. 206,294 filed Nov. 12, 1980, now abandoned.

BACKGROUND OF THE INVENTION

1. Field of the Invention

The invention relates to a mechanism adapted to be removably mounted on a boat and vehicle hitch which enables an individual to conveniently and easily load and unload the boat onto and off of a storage rack mounted on top of the vehicle without assistance. More particularly the invention relates to an improved crank and brake mechanism for controlling the movement of the boat during the loading and unloading of the boat.

2. Description of the Prior Art

Many fishermen and outdoor enthusiasts own relatively small boats commonly referred to as rowboats which are transported on a trailer or on a pair of racks on the vehicle roof. These boats may weigh as much as two hundred or two hundred fifty pounds, making it extremely difficult, if not impossible, for a single individual to load and unload the boat onto and off of the top of the vehicle. Many boaters prefer to transport their boat on the top of the vehicle rather than on a separate trailer due to the additional expense and bother of the trailer. Also, many boaters desire to pull camping trailers with their vehices while transporting their boats, which is difficult if the boat is on a trailer.

Numerous devices have been designed for the purpose of loading and unloading a boat onto and off of the vehicle, some of which are designed to enable only a single individual to use the device. Examples of these prior art constructions are shown in U.S. Pat. Nos. 2,448,125, 3,495,729, 3,716,156, 3,930,584 and 3,976,213.

Many known devices provide no winch or other mechanical advantage, thereby requiring excessive strength on the part of the operator for their use. Other devices require an electrically operated winch, thereby requiring electrical hookups to the vehicle's electrical system and subsequent drain on the vehicle battery. Other winch operated loader and unloaders assert a constant strain on the winch mechanism and subsequently on the operator thereof.

One of the primary disadvantages with known boat loaders and unloaders is that many of their components must be attached by bolts, clamps, etc., to the vehicle, which deface the vehicle as well as provide an unsightly appearance when the boat is not being transported. Other devices require extremely bulky and heavy components which are difficult to store and transport when not in use, and which require excess time for their installation on a vehicle and boat. Other known devices do not permit the same loader and unloader to be adapted to various styles, heights and configurations of vehicles, such as usual passenger cars, station wagons, trucks and vans, thus, requiring separate arrangements and configurations for the various vehicles. Also, in many locations the boat is usually launched and loaded at ramps which slope into the water for boat trailers where there is insufficient side clearance for certain types of loaders and unloaders which are side operated.

Most of these problems have been eliminated by my boat loader and unloader construction shown in U.S. Pat. No. 4,113,126. This construction uses a take-up reel which is removably mounted on the boat for winding and unwinding a cable about the reel for lowering and raising the boat onto and off of the vehicle by the cable. This reel is controlled by a crank and brake mechanism. The particular crank and brake mechanism of this earlier boat loader and unloader uses a pair of spring-biased ratchet discs which permit rotation of the reel in one direction when operated by a crank for raising the boat and which functions as a brake mechanism when lowering the boat from the car by a spring-biased brake release mechanism.

Although this crank and brake mechanism has worked satisfactorily, it is susceptible to dirt, oil and water interfering with the smooth operation of the brake. Also, this prior construction requires a number of parts and components which increases the cost of the mechanism and lessens the reliability thereof.

Therefore, the need has existed for an improved boat loader and unloader having an improved crank and brake mechanism mounted on the cable take-up reel for controlling the loading and unloading of the boat, which is less susceptible to dirt, oil and water, and which has a simpler construction and arrangement of components than prior control mechanisms. No prior known boat loader and unloader of which I am aware provides such a relatively simple crank and brake mechanism which achieves these advantages.

SUMMARY OF THE INVENTION

Objectives of the invention include providing a boat loader and unloader construction which requires only a usual trailer hitch platform and receiver mounted on the rear vehicle frame for attaching the unit on a vehicle, thereby eliminating special types of attachments or alterations to the vehicle body or boat, and which requires a minimum number of components being permanently attached or mounted on the boat or vehicle; providing such a construction which can be removed easily from the vehicle and boat and stored in a relatively small space when not in use, which uses a manually actuated cable reel removably mounted directly on the boat eliminating attachment to the vehicle, in which the reel has an improved crank and brake mechanism for positively controlling the rate of descent of the boat when it is being loaded and unloaded, and in which the brake prevents accidental release of the reel's position to provide safety for the operator; providing such a construction which consists of a minimum number of components, most of which are easily formed of readily available materials, such as steel tubular members; providing such a construction in which the weight of the boat is used to the operator's advantage during the loading and unloading procedure; providing such a construction in which the reel mounting means consists of two small inexpensive brackets which are permanently attached to the sides of the boat adjacent the oarlocks, whereby the reel can be mounted or inserted into the mounting brackets from one side of the boat, eliminating the operator from encircling the boat as heretofore required; providing such a construction in which the improved crank and brake mechanism is less affected by dirt, water and oil than prior control mechanisms, in which the control mechanism uses a plurality of internal camming rollers which provide an extremely effective brake mechanism preventing the accidental slipping or uncontrolled movement of the boat during its loading or unloading, and in which the brake requires much less operator effort to overcome the brake spring than with prior control mechanisms; providing such an improved construction which enables an operator to increase the braking force by movement of the control lever in one direction to prevent an accident in case of brake slippage, which provides for a controlled brake release by movement of the lever in the opposite direction, and in which the control lever is engaged with the brake band by a single ball to enable the brake to maintain uniform pressure throughout its area of clamping engagement thereby compensating for any manufacturing tolerances; providing such an improved construction which enables the reel to be mounted on the boat mounting brackets by a simple and easily operated spring-biased plunger; and providing such an improved construction which is simple, which reduces maintenance and repair problems, which achieves the stated objectives in a simple, effective and inexpensive manner, which provides a safe and effective means for an individual to load and unload a boat onto and off of a variety of vehicles, and which solves problems and satisfies needs existing in the art.

These objectives and advantages are obtained by the boat loader and unloader construction of the type having vertical column means adapted to be mounted on a vehicle, carriage means movably mounted on an upper end of the column means, means mounted on the carriage means for attaching a boat on the carriage means, and reel means adapted to be operatively connected to the boat and connected to the carriage means by cable means, which cable means is manually wound and unwound on the reel means to control the loading and unloading of a boat on a vehicle, wherein the improvement includes control means operatively connected to the reel means for controlling movement of said reel mean, said control means including stub shaft means connected to the reel means for rotation with the reel means; cam means mounted on the stub shaft means and operatively engageable with said shaft means limiting rotation of the shaft means with respect to the cam means in only one direction, with said one rotational direction being the direction in which the cable means is wound on the reel means; a band brake having a nearly circular portion terminating in a pair of spaced outwardly extending leg portions, said band brake partially surrounding the cam means and stub shaft means and operatively engageable with the cam means for controlling movement of the cam means and stub shaft means; lever means operatively engageable with the spaced leg portions of the band brake enabling said leg portions to spread further apart to reduce the clamping engagement between the band brake and cam means enabling the cam means and stub shaft means to rotate together in a direction opposite said one direction for unwinding the cable means from the reel means for unloading the boat and for moving said leg portions closer together to increase the clamping engagement between the band brake and cam means to prevent movement therebetween; and means provided on the stub shaft means for engagement by a manually operated crank for rotating the stub shaft means and reel means in said one direction for winding the cable means on the reel means for loading the boat.

BRIEF DESCRIPTION OF THE DRAWINGS

A preferred embodiment of the invention - illustrative of the best mode in which applicant has contemplated applying the principles - is set forth in the following description and shown in the drawings, and is particularly and distinctly pointed out and set forth in the appended claim.

FIG. 6 is an enlarged, diagraamatic perspective view showing the improved boat loader and unloader;

FIG. 7 is an enlarged fragmentary sectional view taken on line 7—7, FIG. 1;

FIG. 8 is an enlarged fragmentary sectional view taken on line 8—8, FIG. 7;

FIG. 9 is an enlarged fragmentary sectional view taken on line 9—9, FIG. 1;

FIG. 10 is an enlarged fragmentary elevational view looking in the direction of arrows 10—10, FIG. 6, showing the improved crank and brake mechanism;

FIG. 11 is a view of the improved crank and brake mechanism similar to FIG. 10, with the cover plate removed and portions shown in section;

FIG. 12 is a fragmentary sectional view taken on line 12—12, FIG. 10;

FIG. 13 is a fragmentary sectional view taken on line 13—13, FIG. 10;

FIG. 14 is an enlarged fragmentary sectional view taken on line 14—14, FIG. 11;

Similar numerals refer to similar parts throughout the drawings.

DESCRIPTION OF THE PREFERRED EMBODIMENT

Figure 5:
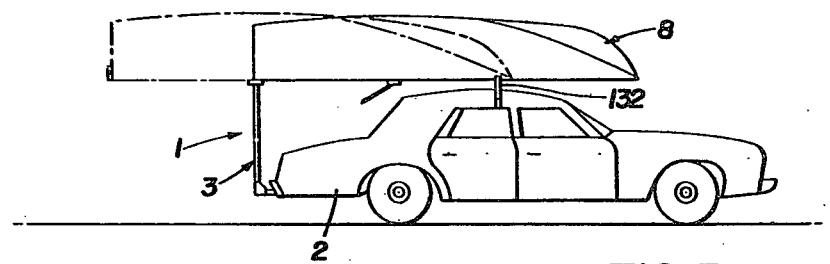
FIGS. 3, 4 and 5 are diagrammatic side views showing in solid and in dot-dash lines the loading and unloading of a boat on a vehicle by the improved boat loader and unloader.
Figure 4:
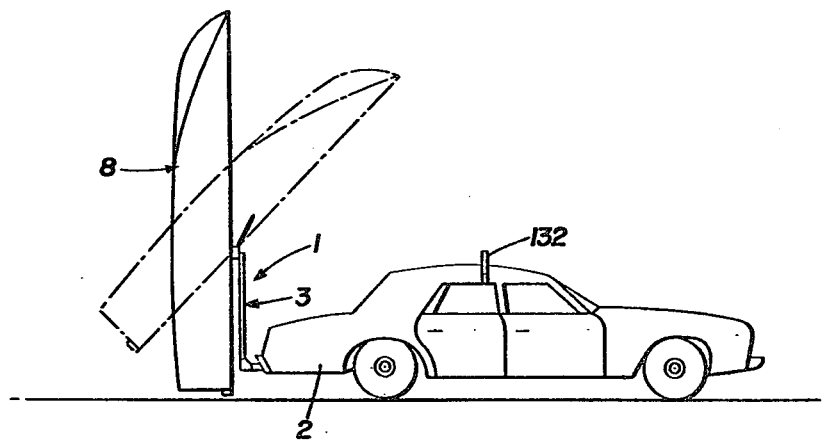

The improved boat loader and unloader is indicated generally at 1, and is shown in FIGS. 1-5 mounted on a vehicle 2 with a boat loading and unloading procedure being shown in solid and dot-dash lines. Construction 1 is shown in greater detail in assembled condition in FIG. 6. Construction 1 includes three main components, a vertical column post indicated generally at 3, a carriage indicated generally at 4, and an improved reel assembly indicated generally at 5.

Post 3 includes inner and outer hollow tubular members 6 and 7 which are telescopically slidably mounted with respect to each other. Members 6 and 7 have a rectangular, crosssectional configuration and are vertically adjustable with respect to each other by an internal crank assembly (not shown) operated by a shaft 9.

The lower end of outer tubular member 7 is mounted in a bracket 10 having a tubular sleeve 11 which is adapted to be telescopically received within a usual trailer hitch (not shown) which is mounted beneath the rear of a vehicle on the vehicle frame. This type of hitch is used for many trailer hitches and, thus, eliminates a special hitch construction. Tubular sleeve 11 is locked in position with the vehicle hitch by a pin which extends through a hole 12 formed in sleeve 11.

Figure 1:
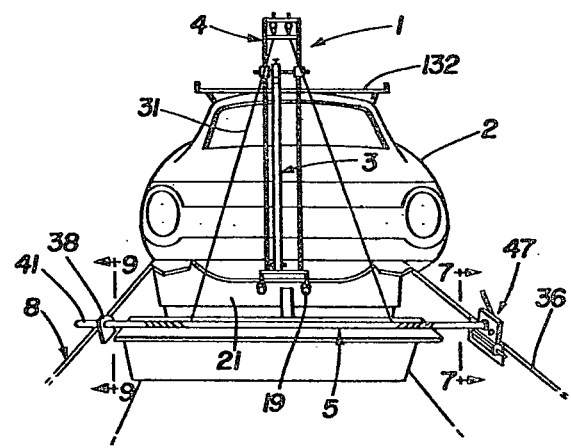
FIG. 1 is a fragmentary, diagrammatic end view showing the improved boat loader and unloader mounted on the rear of a vehicle and connected to a boat prior to its being loaded on the vehicle.
Figure 15:
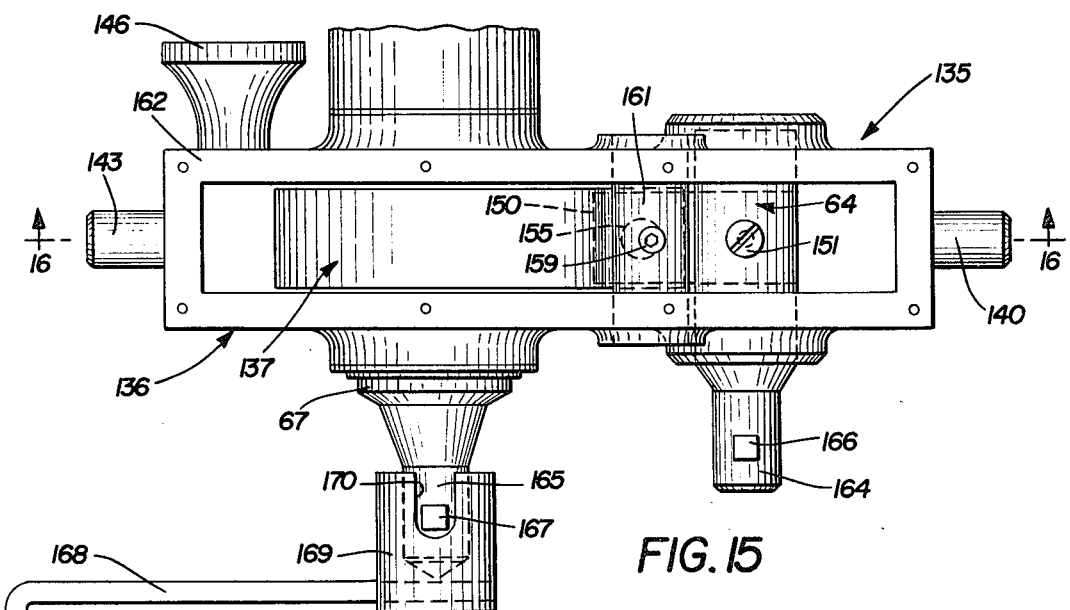
FIG. 15 is a top plan view of a modified crank and brake mechanism with the top cover removed.

Carriage 4 (FIG. 6) has a pair of spaced parallel tubular rails 15 which are connected at their ends by cross members 16 and 17 and a reinforcing brace 18. A pair of C-clamps 19 are pivotally mounted by bolts 20 to the ends of cross member 16 and are adapted to clampingly engage the transom 21 of a boat 8 (FIG. 1). A vertical post end cap roller assembly, indicated generally at 22, is mounted on and extends between rails 15. End cap assembly 22 includes a rectangular-shaped end cap 23 which is similar in cross section and dimension to outer tubular member 7 and which is telescopically mounted on the upper end of inner tubular member 6. A sleeve 24 extends through end cap 23 and is secured in a predetermined fixed position by a clamping bolt 25. A pair of grooved rolllers 26 are fixed to a shaft 28, which is telescopically rotatably mounted within sleeve 24, and are rotatable with shaft 28. Rollers 26 are partially covered by upper shroudlike members 27 which are pivotally mounted on the ends of sleeve 24.

Tubular rails 15 are adapted to move along rollers 26 and are retained in position by shrouds 27 when end cap assembly 22 is mounted on post 3. A pair of eye-bolts 30 are mounted on cross member 17 to which the ends of a boat lowering and raising cable 31 are attached. A plurality of aligned holes 32 are formed in rails 15 adjacent cross member 18 for receiving stop bolts 33 which limit the travel of carriage 4. The position of stop bolts 33 is dependent upon the length and balance of the particular boat to be used with boat loader and unloader 1. Carriage 4 is slidably movable along end cap roller assembly 22 within shrouds 27 and is pivotally mounted with respect to end cap 23 and post 3 by the pivotal mounting of shrouds 27 on shaft 24.

Reel assembly 5 (FIG. 6) includes a cable take-up tube 35 adapted to be rotatably mounted transversely across rim 36 of boat 8 by a pair of brackets 38 and 39 (FIGS. 7, 8 and 9). Bracket 38 is attached to boat rim 36 by a plurality of rivets 40 for telescopically receiving an end section 41 of take-up tube 35 therein.

Bracket 39 is attached to the opposite side of boat 8 by rivets 43 (FIGS. 7 and 8). Bracket 39 includes an outwardly extending flange 45 on which the improved reel control, crank and brake mechanism, which is indicated generally at 47, is attached. Control mechanism 47 is pivotally mounted on flange 45 by a bracket 48 which is attached to flange 45 by a pair of bolts 49. Bracket 48 terminates in a pair of spaced, upstanding end flanges 50 having holes 51 formed therein for telescopically receiving a hinge pin 52. Hinge pin 52 has a locking ring 53 mounted in one end and a pivotally mounted tab 54 mounted in a slot formed in the other end for securely locking hinge pin 52 on bracket 48. Hinge pin 52 is telescopically received within a hinge tube 56 which is welded at 57 to the bottom of a housing 58, which housing contains improved control crank and brake mechanism 47.

Housing 58 has a generally rectangular configuration formed by a first wall 59 (FIGS. 7 and 13) which terminates in inwardly projecting peripheral flanges including top and bottom flanges 60 and 61 and side flanges 62 (FIG. 11). Wall 59 is formed with a closed end circular boss 63 (FIG. 13) into which the end of a brake control lever shaft 64 projects. Wall 59 includes a larger circular boss 66 (FIG. 12) surrounding an opening 68 through which a stub shaft 67 extends. Housing 58 further includes a second wall 69 which terminates in peripheral flanges consisting of a top flange 71, a bottom flange 72 and side flanges 73. Peripheral flanges 71, 72 and 73 are engaged with and are outside of inner flanges 60, 61 and 62, respectively, of wall 59. Housing walls 59 and 69 are clamped in assembled position by a plurality of bolts 75 (FIGS. 10-13).

Housing wall 69 (FIGS. 10, 12 and 13) is formed with a circular boss 76 surrounding an opening 74 in which a cylindrical portion 77 of brake control lever shaft 64 is rotatably journaled. Shaft 64 is formed integrally with and extends perpendicularly from handle 65 of a brake control lever 55. An internal annular groove 78 is formed in the interior of boss 76 in which an O-ring 79 is seated to prevent dirt, oil and water from entering the interior of housing 58 along shaft 64. An annular groove 82 is formed in shaft portion 77 and receives a locking washer 83 therein. Locking washer 83 and the closed end of boss 63 retain shaft 77 of control lever 55 in its mounted position within housing 58.

A larger circular boss 85 (FIG. 12) is formed on housing wall 69 and surrounds an opening 86 through which stub shaft 67 projects. A pair of internal, annular grooves 88 and 89 are formed in bosses 66 and 85 for receiving O-rings 90 and 91, respectively, (FIG. 12), to provide seals preventing the flow of contaminants along shaft 67 and into the interior of housing 58. Shaft 67 terminates at one end in a squared configuration 94 which is adapted to receive a crank handle for manually rotating shaft 67. The opposite end of shaft 67 is integrally connected to an enlarged cylindrical shaft portion 95 which is telescopically received within the end of reel tube 35. Shaft portion 95 is fixed to reel tube 35 by a bolt 96 which extends through aligned holes, whereby stub shaft 67 rotates with reel tube 35. A bearing washer 98 is mounted between the end of reel tube 35 and boss 66 to reduce the rotational friction therebetween when tube 35 is rotated with respect to housing 58 of crank and brake control mechanism 47. An annular groove 99 is formed in the outer end of shaft 67 and receives a locking washer 100 therein to retain housing 58 rotatably mounted on stub shaft 67 in abutting engagement with the end of reel tube 35 through bearing washer 98.

In accordance with one of the main features of the invention, improved control mechanism 47 (FIGS. 11, 12 and 13) controls the movement of stub shaft 67 and, correspondingly, controls the movement of cable reel tube 35. Control mechanism 47 includes a band brake, indicated generally at 103, having a nearly circular portion 104 which is integrally connected with and terminates in upper and lower straight leg portions 105 and 106. A pair of vertically aligned holes, unthreaded hole 108 and threaded hole 109 are formed in the ends of straight leg portions 105 and 106, respectively, and mount an adjustment bolt 110 thereon (FIG. 11). A coil compression spring 111 is telescopically mounted on bolt 110 between the straight leg portion 105 and an upper washer 112 mounted beneath bolt head 113.

An annular camming ring 116 is telescopically mounted within a central circular opening 117 formed by circular portion 104 of band brake 103. A brake lining 118 is located between the outer cylindrical surface of ring 116 and the inner cylindrical surface of band brake portion 104. The inner surface of camming ring 116 is provided with a plurality of spaced inclined ramps 119, against which cylindrical-shaped rollers 120 are spring biased by oblong-shaped coil springs 121 (FIG. 14). Ring 116 is formed with a circular-shaped central opening 123 through which stub shaft 67 extends. Rollers 120 are biased by springs 121 into a wedging, camming engagement between ramp surface 119 and the outer cylindrical surface of stub shaft 67. This camming arrangement enables shaft 67 to be rotated freely in a clockwise direction (FIG. 11) upon rotation of shaft 67 and take-up tube 35 by a wrench which is engaged with squared end 94 of shaft 67. However, this camming arrangement prevents rotation of shaft 76 in the counterclockwise direction until the biasing force of spring 111 is relieved from brake band leg portions 105 and 106.

Brake control lever shaft 77 is formed with a flat 125 which extends in a normal direction between band brake leg portions 105 and 106. The curved portion 126 of shaft 77, located beneath flat 125, is engaged with the upper surface of straight band leg portion 106. Rotation of shaft 77 by manual operation of brake control lever 55 causes edge 124 of flat 125 to engage the bottom surface of band brake leg 105. This action overcomes the biasing force of spring 111 and spreads leg portions 105 and 106 further apart, which also will open circular brake band portion 104 releasing the gripping action between brake lining 118 and camming ring 116 permitting shaft 67 to rotate freely in the counterclockwise direction together with caming ring.

A hole 127 is formed in flange 60 of housing wall 59 in alignment with bolt head 113 for rotating bolt 113 within housing 58 for regulating the biasing tension exerted by spring 111 on brake band legs 105 and 106. A plug 128 preferably is seated in opening 127 to prevent the entrance of dirt and other foreign objects into the interior of housing 58.

FIGS. 1–5 diagrammatically illustrate the operation of loader and unloader construction 1. In a loading procedure, boat 8 is placed on the ground in a horizontal position (FIG. 3) with transom 21 being adjacent the rear of vehicle 2. Carriage 4 is pivoted downwardly to a vertical position and C-clamps 19 are secured to transom 21. Reel assembly 5 is mounted on and extends transversely across the midpoint of the boat with end section 41 of reel tube 35 being telescopically inserted into opening 130 formed in bracket 38. The other end of reel tube 35 is mounted on bracket 39 by insertion of hinge pin 52 within hinge tube 56, followed by the subsequent pivotal movement of locking tab 54.

Figure 3:
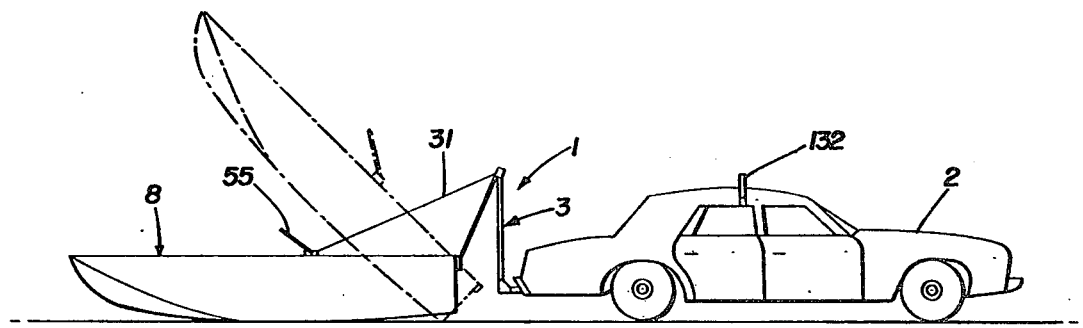
Figure 2:
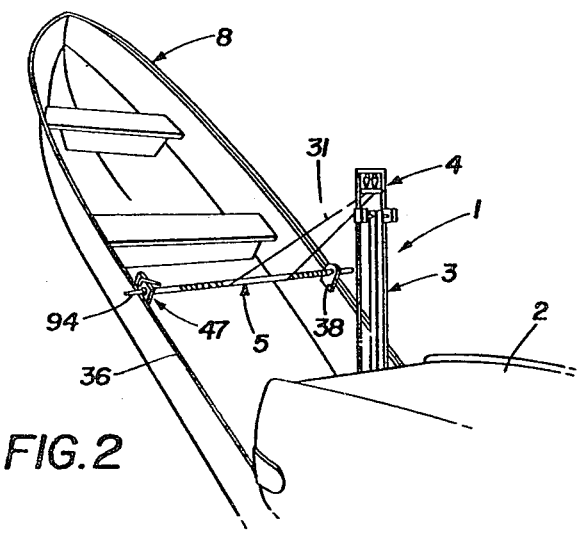
FIG. 2 is a fragmentary, diagrammatic view similar to FIG. 1 showing the boat being partially raised during a loading operation.

A crank is placed on squared shaft end 94 of tube 35 and is rotated manually, pivoting boat 8 upwardly from its horizontal, full-line position of FIG. 3 to an intermediate. partially raised position shown in dot-dash lines, which position is similar to that of FIG. 2. C-clamps 19 will pivot about their mounting bolts 20 and carriage 4 may move or pivot slightly on roller 26 and shroud members 27. Continued operation of the crank winds cable 31 about tube 35, pivoting boat 8 to the full, upright, vertical position shown in full lines in FIG. 4. In this vertical position, the weight of the boat is supported entirely by post 3 through its pivotal connection with rails 15 of carriage 4.

The operator then lifts upwardly outwardly on the rear of boat 8, pivoting carriage 4 about horizontal end cap sleeve 24. Only a minimum of effort is required to pivot the boat upwardly since the pivot provided by post rollers 26 is located generally at the midpiont or center of gravity of boat 8. Upon boat 8 reaching the dot-dash line position of FIG. 4, the boat's center of gravity shifts forwardly of vertical post 3, whereby the boat continues downwardly to the horizontal, dot-dash line position of FIG. 5. Again, only a minimum amount of effort on the operator's part is required to control the weight of the boat's descent due to the location of post rollers 26 being located adjacent the boat's center of gravity.

A usual vehicle storage rack 132 is mounted on the top of vehicle 2 in the proper position to engage the bow of the boat upon its reaching the dot-dash line position of FIG. 5. The operator then shoves forwardly on the rear of the boat to move the boat horizontally on the rear of the boat from the dot-dash to the full-line position of FIG. 5. This forward movement is facilitated due to the sliding and rolling engagement of carriage rails 15 with rollers 26. Boat 8, upon reaching the forward or full-line position of FIG. 5, is supported entirely on post 3 and rack 132.

The unloading procedure is basically the reverse of the above-described loading procedure. The operator pulls backwardly on the rear of the boat and upon the boat reaching the dot-dash line position of FIG. 5, pulls downwardly on the rear of the boat. This downward movement pivots the bow upwardly through the dot-dash line position of FIG. 4 until it reaches the full-line, vertical, upright position of FIG. 4.

In accordance with the invention, the operator then operates brake control lever 55. Only a very small amount of lever movement will result in lever shaft 64 spreading band brake legs 105 and 106 further apart, releasing the gripping action of brake lining 118 against camming ring 116. This permits shaft 67 and camming ring 116 to rotate in a counterclockwise boat unloading direction. The boat's weight will automatically attempt to rotate shaft 67 and tube 35 in the counterclockwise direction (FIG. 11) which unwinds cable 31 from tube 35 until the boat assumes a horizontal, at-rest position on the ground. Improved crank and brake control mechanism 47 enables the boat's rate of descent to be controlled extremely easily by a slight manipulation of control lever 55. Only a very small amount of rotational pressure need be exerted on lever 55 to release the gripping engagement between brake lining 118 and camming ring 116. Thus, the rate of descent can be at any speed desired by the operator to ensure a safe lowering of the boat from its vertical, upright position to its horizontal position on the ground. Again, should the operator's grip on lever 55 be relaxed or removed, the brake will automatically prevent further descent of the boat and unwinding of cable 31.

One of the advantages of improved control mechanism 47 is that brake band liner 118 is formed of an oiled leather and is unaffected by water and oil which it will encounter during use. This wet oily environment is one of the main disadvantages of prior control mechanisms, often resulting in improper operation of the loading and unloading mechanism and possible injury to the operator thereof.

Improved control mechanism 47 provides positive control for the operator at all times during both the loading and unloading procedures and eliminates any great physical exertion by the operator, except for a relatively easy cranking motion during the loading of the boat. This enables even a single individual, regardless of his physical strength and ability, to load and unload a boat onto and off of the top of a vehicle. The tension of brake band spring 111 enables the desired amount of tensioning force or braking force to be placed on the brake band by simple rotation of bolt 110.

The mechanical advantage achieved by lever 55 is considerable, requiring only a slight amount of force to be applied to the lever to rotate lever shaft 64, whereupon corner 124 of flat 125 will exert a spreading action on band brake legs 105 and 106. This apreading action releases brake action of lining 118 on camming ring 116 permitting the camming ring and cable reel to turn counterclockwise lowering the boat.

It has been found that only a single roller 120 and biasing spring 121 is sufficient to prevent rotation of shaft 67 in the one direction, yet permit its free rotation in the opposite direction. Therefore, should one or more of the camming rollers 120 and their associated springs 121 fail for any reason, the control mechanism will work satisfactorily as long as only one camming roller is operable. Furthermore, the accumulation of moisture or dirt within the ban brake will have negligible effect on the camming action of the rollers.

Take-up tube 35 is removed easily from its position across boat 8 by removing hinge pin 52 from within hinge tube 56 and telescopically disengaging tube end section 41 from within its engagement in bracket 38.

A modified reel control, crank and brake mechanism is indicated generally at 135, and is shown in FIGS. 15 through 18. Mechanism 135 includes a housing 136 preferably formed of cast aluminum, in which a band brake 137 is mounted in the same manner as band brake 103. The only differences between band brake 137 and band brake 103 is that the pair of spaced legs 138 and 139 of brake 137 are shorter than legs 105 and 106 of brake 103. The remaining features are the same and, therefore, are not discussed in detail.

Figure 16:
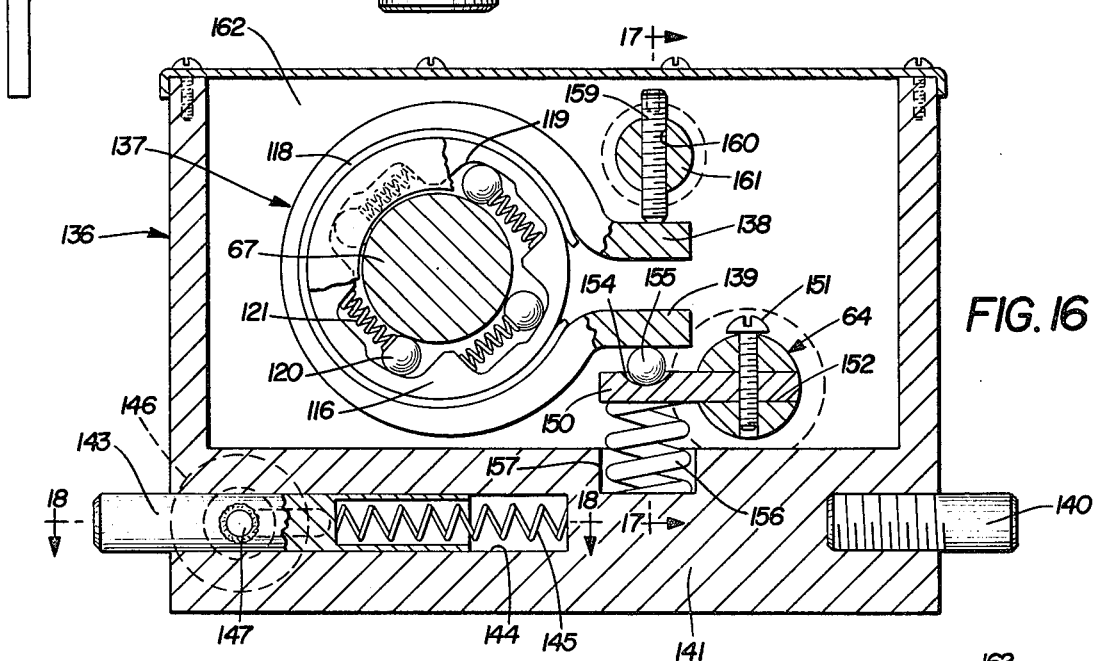
FIG. 16 is a sectional view of the modified mechanism of FIG. 15 taken on line 16—16, FIG. 15.
Figure 18:
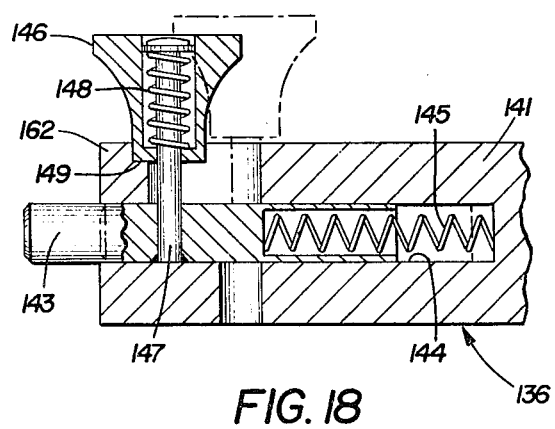
FIG. 18 is a fragmentary sectional view taken on line 18—18, FIG. 16, with the control knob and mounting pin being shown in full lines in extended position and in dot-dash lines in retracted position.
Figure 17:
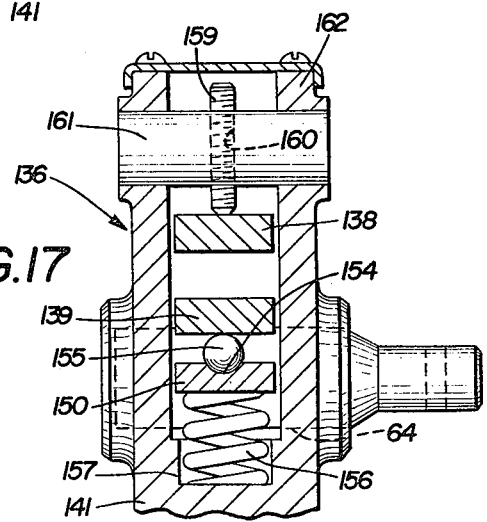
FIG. 17 is a fragmentary sectional view taken on line 17—17, FIG. 16.

In accordance with one of the features of modified crank and brake mechanism 135 is the particular means for mounting it on boat bracket 48. A pin 140 is mounted in a fixed position in a thickened bottom wall 141 of housing 136. Pin 140 is adapted to ba slidably inserted through hole 51 formed in one of the end flanges 50 of bracket 48. A movable pin 143 is mounted in an elongated cylindrical-shaped opening 144 formed in bottom wall 141 and is biased by a coil spring 145 in an outwardly extended direction as shown in FIG. 16. A control knob 146 is connected to pin 143 for sliding pin 143 between its extended and retracted positions as shown particularly in FIG. 18. Knob 146 is mounted on a shaft 147 and is biased toward pin 143 by a coil spring 148. The lower end of knob 146 is adapted to be seated in a recess 149 formed in a side wall 162 of housing 136, to retain pin 143 in its outwardly extending position.

Pins 140 and 143 enable crank and brake mechanism 135 to be mounted easily on the side of a boat. Knob 146 need only be pulled outwardly against the biasing force of spring 148 and pin 143 retracted into housing opening 144. Fixed pin 140 is inserted through one of the bracket flange holes 51 after which movable pin 143 is released when aligned with an opposite flange hole 51, whereupon spring 145 will bias pin 143 outwardly and into engagement with bracket flange 50. When in this installed position, the lower end of knob 146 is biased by spring 148 into locked position within recess 149. This construction enables an operator to easily install modified crank and brake mechanism 135 on the boat by a simple manipulation of control knob 146 and insertion of pins 140 and 143 in aligned bracket holes 51.

In accordance with another feature of the invention, modified crank and brake mechanism 135 enables an operator to apply greater braking pressure on band brake 137 to prevent any possible slippage of the brake during loading and unloading of the boat. In the event that the brake tensioning force provided by bolt 110, spring 111 and bolt head 113 of mechaniam 47 (FIG. 11) is not great enough, slippage could occur between camming ring 116 and brake lining 118 permitting stub shaft 67 and cable take-up tube 35 to rotate prematurely which could result in injury to the operator or damage to the boat. This improved safety feature provided by crank and brake mechanism 135 is shown particularly in FIG. 16. Shaft 64 of brake control lever 65 has a rectangular-shaped tab 150 extending radially outwardly from the end thereof within housing 136. Tab 150 is mounted by a screw 151 in a slot 152 forming in the end of shaft 64. A cavity 154 is formed in tab 150 adjacent the outer end thereof, in which a ball 155 is seated. Ball 155 and tab 150 are biased into engagement with band brake leg 139 by a coil spring 156 which is seated in a cylindrical-shaped recess 157 formed in housing bottom wall 141.

The tension on band brake 137 is initially set by a tension adjustment bolt 159 which is threadedly engaged within an opening 160 formed in a rod 161 which extends between and is mounted on housing side walls 162. Bolt 159 adjusts the tension on band brake 137 in the similar manner as does bolt 110 in control mechanism 47 described above and shown in FIG. 11. Ball 155 enables the band brake to "float" in order to maintain constant pressure between camming ring 116 and friction liner 118 by compensating for any manufacturing tolerances and misalignment that may occur during installation and manufacture of crank and brake mechanism 135.

In accordance with the improved safety feature provided by mechanism 135, the operator during a boat loading or unloading procedure, needs only to rotate brake control shaft 64 in a clockwise direction as shown in FIG. 16 to increase the braking force between camming ring 116 and liner 118 preventing rotation of stub shaft 67 and correspondingly cable take-up reel 35. This will prevent any slippage from occurring between the braking components eliminating premature rotation of reel 35 and unwanted movement of the boat as a result thereof. The operator will rotate lever shaft 64 in a counterclockwise direction to release or reduce the amount of force applied by spring 156 and ball 155 on band brake 137 permitting shaft 67 to rotate at a desired rate for lowering of the boat.

It has been found that this safety feature provided by modified crank and brake mechanism 135 will eliminate the possibility of any problems from occurring during the loading or unloading of a boat even if the brake tension is not properly set, since only a small amount of force need be applied by lever shaft 64 in a clockwise direction to prevent any slippage from occurring between the brake components.

Both shafts 64 and 67 are formed with rounded outer ends 164 and 165, respectively. Square headed setscrews 166 and 167 are mounted in outer ends 164 and 165 of shafts 64 and 67 for engagement with an operating handle 168. Handle 168 has a sleeve 169 formed with a slot 170 into which setscrews 166 and 167 are received for rotating shafts 64 and 67. The single handle 168 which operates both shafts 64 and 67 provides additional safety. Handle 168 must be used to release the brake by engagement of sleeve slot 170 with setscrew 166 of shaft end 164 preventing the handle from being left on shaft 67 and spinning during lowering of the boat.

Accordingly, the improved boat loader and unloader construction provides a relatively simple mechanism which is removably mounted on a boat and vehicle to enable an individual to load and unload a boat with a minimum of physical effort, yet provides positive control of the boat at all times to the operator ensuring his complete safety. Construction 1 also provides an effective and safe mechanism which avoids difficulties with prior devices and achieves the objectives and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved boat loader and unloader is constructed and used, the characteristics of the construction, and the advantageous, new and useful results obtained; the new and useful structures, devices, elements, arrangements, parts, and combinations are set forth in the appended claims.

I claim:

1. In an improved boat loader and unloader construction of the type having vertical column means adapted to be mounted on a vehicle, carriage means movably on an upper end of the column means, means mounted on the carriage means for attaching a boat on the carriage means, and reel means adapted to be operatively connected to the boat and connected to the carriage means by cable means, which cable means is manually wound and unwound on the reel means to control the loading and unloading of a boat on a vehicle, wherein the improvement includes control means operatively connected to the reel means for controlling movement of said reel means, said control means including stub shaft means connected to the reel means for rotation with the reel means; cam means mounted on the stub shaft means and operatively engageable with said shaft means limiting rotation of the shaft means with respect to the cam means in only one direction, with said one rotational direction being the direction in which the cable means is wound on the reel means; a band brake having a nearly circular portion terminating in a pair of spaced outwardly extending leg portions, said band brake partially surrounding the cam means and stub shaft means and operatively engageable with the cam means for controlling movement of the cam means and stub shaft means; lever means operatively engageable with the spaced leg portions of the band brake enabling said leg portions to spread further apart to reduce the clamping engagement between the band brake and cam means enabling the cam means and stub shaft means to rotate together in a direction opposite said one direction for unwinding the cable means from the reel means for unloading the boat and for moving said leg portions closer together to increase the clamping engagement between the band brake and cam means to prevent movement therebetween; said lever means including a spring which operatively engages one of the spaced leg portions and biases said one leg portion toward the other of said leg portions and, correspondingly, biases the band brake into gripping engagement with the cam means; said lever means also including an actuating tab which engages the spring and one of the spaced leg portions of the band brake, and which tab reduces the biasing force of the spring upon operation of the lever means in one direction to enable said leg portions to spread further apart to release engagement of the band brake with the cam means; and means provided on the stub shaft means for engagement by a manually operated crank for rotating the stub shaft means and reel means in said one direction for winding the cable means on the reel means for loading the boat.

2. An improved crank and brake mechanism for controlling the rotation of a cable take-up tube of a boat loader and unloader device, said mechanism including:
   (a) a housing having aligned openings formed therein;
   (b) a stub shaft rotatably mounted on said housing and extending through the aligned housing openings, said stub shaft being adapted to be connected to the cable take-up tube for rotation with said take-up tube;
   (c) a band brake having a nearly circular-shaped portion terminating in a pair of spaced outwardly extending leg portions;
   (d) an annular camming ring formed with a central opening telescopically mounted on the stub shaft and located within the circular-shaped portion of the band brake;
   (e) at least one ramp surface formed on the camming ring adjacent the stub shaft;
   (f) a spring-biased camming roller engaged between the ramp surface and stub shaft restricting rotation of the stub shaft in one direction while permitting free rotation in the opposite direction with respect to the camming ring;
   (g) spring means biasing the spaced leg portions of the band brake toward each other for operatively clampingly engaging the circular-shaped portion of the band brake about the camming ring preventing rotation of said camming ring;
   (h) lever means operatively engageable with the spaced leg portions of the band brake and movable in a first direction enabling said leg portions to spread further apart to reduce the clamping engagement between the band brake and camming ring permitting rotation of the camming ring and stub shaft in said one direction, and movable in a second direction to move said leg portions closer together to increase the clamping engagement between the band brake and camming ring;
   (i) the lever means including a shaft located adjacent the pair of spaced leg portions; and
   (j) a tab mounted on said lever means shaft operatively engaged with one of the spaced leg portions when the lever means is moved in the second direction to move said leg portions closer together, and said tab being operatively engaged with the spring means and reducing the biasing force of the spring means when the lever means is moved in the first direction.

3. The mechanism defined in claim 2 in which a ball is mounted between and is operatively engaged with the lever means shaft tab and said one spaced leg portion engaged thereby enabling the camming ring to float when engaging the circularshaped portion of the band brake.

4. The mechanism defined in claim 2 in which a spring-biased hinge pin is movably mounted on the housing for attaching said mechanism on a boat.

* * * * *

UNITED STATES PATENT AND TRADEMARK OFFICE
CERTIFICATE OF CORRECTION

PATENT NO. : 4,470,745
DATED : September 11, 1984
INVENTOR(S) : Allen M. Shotwell It is certified that error appears in the above-identified patent and that said Letters Patent are hereby corrected as shown below:

Last line of the Abstract, "loding" should be - loading - ;

Col. 3, line 37, "mean" should be - means - ;

Col. 4, line 4, "claim" should be - claims - ;
Col. 4, line 16, "diagraamatic" should be - diagrammatic - ;

Col. 5, line 5, "with" should be - within - ;
Col. 5, line 21, "rolllers" should be - rollers - ;

Col. 7, line 13, "76" should be - 67 - ;
Col. 7, line 30, "caming" should be - camming - ;

Col. 9, line 20, "ban" should be - band - ;
Col. 9, line 53, "extending" should be - extended - ;

Col. 10, line 17, "forming" should be - formed - ;

Claim 1, Col. 11, line 33, after "movably" insert - mounted - .

Signed and Sealed this

Twelfth Day of March 1985

[SEAL]

Attest:

DONALD J. QUIGG

Attesting Officer   Acting Commissioner of Patents and Trademarks